United States Patent [19]
Månsson et al.

[11] Patent Number: 5,720,559
[45] Date of Patent: Feb. 24, 1998

[54] COMBINED BEARING AND FLUID SUPPLY UNIT

[75] Inventors: Staffan Månsson, Hjälteby; Bo Kristiansson, Kungsör, both of Sweden

[73] Assignee: AB Volvo Penta, Chesapeake, Va.

[21] Appl. No.: 581,341

[22] Filed: Dec. 29, 1995

[51] Int. Cl.$^6$ .................. F16C 19/00; F16C 33/10
[52] U.S. Cl. .................. 384/474; 384/475; 384/398; 475/160
[58] Field of Search .................. 74/337; 475/160; 192/48.91, 51, 113.5; 384/391, 398, 399, 474, 475

[56] References Cited

U.S. PATENT DOCUMENTS

| | | |
|---|---|---|
| 3,757,822 | 9/1973 | Kell .................. 192/51 X |
| 4,181,378 | 1/1980 | Schmaeng .................. 384/398 X |
| 4,297,097 | 10/1981 | Kiekhaefer .................. 440/75 |
| 4,358,253 | 11/1982 | Okano et al. .................. 384/398 X |
| 4,576,264 | 3/1986 | Lupo et al. .................. 192/48.91 |
| 4,679,673 | 7/1987 | Yamaoka et al. .................. 440/75 |
| 4,878,571 | 11/1989 | Sacher .................. 192/48.91 |
| 4,988,218 | 1/1991 | Quanglia .................. 384/475 |

FOREIGN PATENT DOCUMENTS

| | | | |
|---|---|---|---|
| 3223007 | 12/1983 | Germany .................. | 384/475 |
| 52-60353 | 5/1977 | Japan .................. | 384/474 |
| 57-200724 | 12/1982 | Japan .................. | 384/474 |
| 5-60145 | 3/1993 | Japan .................. | 384/474 |
| 205983 | 9/1939 | Switzerland .................. | 384/474 |
| 1238199 | 7/1971 | United Kingdom .................. | 384/474 |
| 1258975 | 1/1972 | United Kingdom . | |

*Primary Examiner*—Khoi Q. Ta
*Attorney, Agent, or Firm*—Howrey & Simon; Richard H. Kjeldgaard; Michael J. Bell

[57] ABSTRACT

A combined bearing and fluid supply unit is disclosed primarily for use in a power transmission system for marine vessels. The unit has a housing having a circular opening. The circular opening is delimited by an inner surface of the housing, and the inner surface is provided with one or more first circumferentially extending channels which respectively accommodate one or more bearings. The bearings are adapted to support a shaft passing through the circular opening. The housing also includes a first bore extending radially from a second circumferentially extending channel in the inner surface of the housing to an outer surface of the housing. This second circumferentially extending channel is adapted to convey fluid passing from the first bore to a first internal passage in the shaft. Preferably, this fluid is used to actuate a clutch carried on the shaft in a given direction. A second radial bore and a third circumferentially extending channel may be provided in the housing, in communication with the bearing, in order to provide lubricating fluid for the bearing. A third radial bore and a fourth circumferentially extending channel may be provided so as to actuate the clutch to rotate the shaft in the opposite direction.

15 Claims, 3 Drawing Sheets

5,720,559

COMBINED BEARING AND FLUID SUPPLY UNIT

BACKGROUND OF THE INVENTION

1. Field of the Invention

The present invention relates to a combined bearing and fluid supply unit particularly, though not exclusively, intended for use in a power transmission system in marine vessels. The invention further relates to a power transmission system incorporating such a combined bearing and fluid supply unit.

2. Description of Related Art

A hydraulic inboard power transmission system for a marine vessel is known in which selection between forward and reverse gears is accomplished by operating a valve assembly to direct hydraulic fluid to either one of a pair of multi-plate clutches carried on a horizontally or vertically disposed drive shaft. In this known system, the drive shaft is driven by a substantially horizontally disposed input shaft from the motor of the vessel; the input shaft engages a pair of bevel gears associated with the pair of multi-plate clutches on the drive shaft. The drive shaft is provided with three internal passages for the conveyance of hydraulic fluid to the pair of multi-plate clutches in response to operation of the valve assembly. The valve assembly is disposed near the upper end of the drive shaft where the hydraulic fluid is fed into the internal passages of the draft shaft.

While the above-described known system offers the advantage of quiet engagement of forward and reverse gears, the drive shaft is relatively long due chiefly to the location of the valve assembly above the pair of clutches. Not only does the length of the drive shaft necessitate the disposal of support bearings towards the ends of the drive shaft, it also causes the height of the transmission system to become considerable. This may not pose a particular problem in large marine vessels, however in smaller vessels there may be insufficient space in the engine room to accommodate such a transmission.

Again, primarily because of space considerations, many marine vessels having an inboard mounted motor have the transmission and propeller drive arranged in a single unit which is pivotally attached to the stern of the vessel. The above-described transmission system, in which the valve assembly sits above the clutches on the drive shaft, is not optimal for such stern drive installations because of the great height of the system.

A stern drive system is disclosed in WO-A-91/19644 (PCT/NO91/00088), in which an inboard motor drive shaft is coaxial with an input shaft in an outboard stern drive unit. The drive shaft cooperates via a gear arrangement with an output shaft disposed at an acute angle to the drive shaft. Hydraulic fluid is supplied to the drive shaft at a location between two clutches on the drive shaft. While the coaxial arrangement of the drive and input shafts provides a reduction in the height of the transmission, the length of the system increases. Furthermore, because of the required gear reduction for marine applications, the gear arrangement is relatively bulky. In addition, in order to reverse the direction of rotation of the output shaft, i.e., to shift from forward to reverse and vice versa, an intermediate gear is required between the drive shaft and the output shaft.

SUMMARY OF THE INVENTION

It is therefore an object of the present invention to provide a compact power transmission system which is suitable for both inboard and outboard marine applications.

In accordance with one aspect of the present invention, the above and other objects are attained by the provision of a combined bearing and fluid supply unit. The unit includes a housing having a circular opening extending therethrough; the opening is adapted to accommodate a shaft such as a drive shaft. On an inner surface of the housing, in the circular opening, there is provided at least one first circumferentially extending channel in which a bearing is disposed. The bearing is adapted to support the shaft passing through the circular opening. Preferably, two first circumferentially extending channels are provided, each having a bearing. A second circumferentially extending channel is provided in the inner surface of the housing. The housing further includes a first bore extending radially from the second circumferentially extending channel to an outer surface of said housing. Hydraulic fluid may be selectively passed from the first bore through the second circumferentially extending channel and on to a first internal passage in the shaft. This first internal passage may be in communication with a clutch; the delivery of hydraulic fluid to the first internal passage actuates the clutch so that the shaft may rotate in a first given direction (i.e., clockwise or counterclockwise). A second radial bore and a third circumferentially extending channel may be provided in the housing, in communication with the bearing, in order to provide lubricating fluid for the bearing. A third radial bore and a fourth circumferentially extending channel may be provided to allow passage of fluid to actuate the clutch to rotate the shaft in the opposite direction.

The present invention further provides for a power transmission system including an input shaft having a first bevel gear attached thereto, and a drive shaft arranged substantially perpendicular to the input shaft. The drive shaft is preferably supported by a combined bearing and fluid supply unit as discussed above. The drive shaft may be provided with a pair of second bevel gears for cooperation with the first bevel gear on the input shaft. Each of the second bevel gears may be selectively engageable with the drive shaft via a clutch for co-rotation with the drive shaft when the clutch is activated. Preferably, the combined bearing and fluid supply unit is positioned between the second bevel gears.

By providing an integral bearing and fluid supply unit in the transmission system, the overall dimensions of the system may be reduced, resulting in a more compact transmission usable on smaller marine vessels.

BRIEF DESCRIPTION OF THE DRAWINGS

The invention will be described in the following in greater detail by way of example only and with reference to the attached drawings, in which.

DETAILED DESCRIPTION OF PREFERRED EMBODIMENTS

Figure 1:
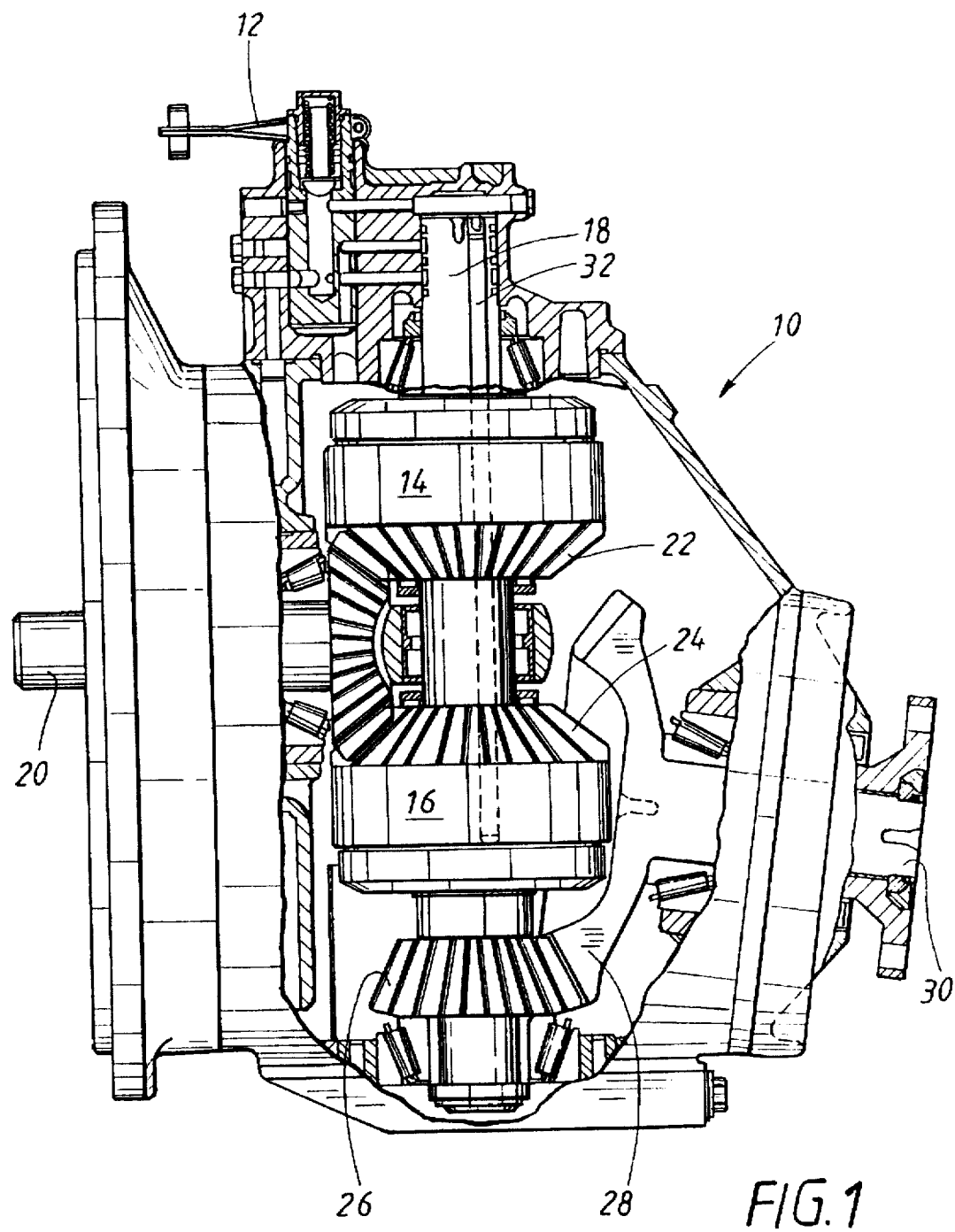
FIG. 1 is a partial sectional view of a known power transmission system.

In FIG. 1, reference numeral 10 generally denotes an inboard power transmission system for a marine vessel of the type discussed in the Background section. In this known arrangement, forward and reverse gear selection is obtained by operating a valve assembly 12 to direct hydraulic fluid to either one of a pair of multi-plate clutches 14, 16 carried on a substantially vertically disposed drive shaft 18. The drive shaft 18 is driven by a substantially horizontally disposed input shaft 20 from the motor of the vessel (not shown). Accordingly, the input shaft 20 engages a pair of bevel gears 22, 24 associated with the pair of multi-plate clutches 14, 16 on the drive shaft 18. The drive shaft is provided at its lower end with a bevel gear 26 which meshes with a crown wheel 28 or the like affixed to an output shaft 30. The output shaft 30 is intended to drive a propeller (not shown). The drive shaft 18 is provided with three internal passages, one of which is shown in the drawing as internal passage 32. Internal passage 32 is provided for the conveyance of hydraulic fluid to the pair of multi-plate clutches 14, 16 in response to operation of the valve assembly 12. As shown in FIG. 1, the valve assembly 12 is disposed near the upper end of the drive shaft 18, where the hydraulic fluid is fed into the internal passages of the drive shaft.

Figure 2:
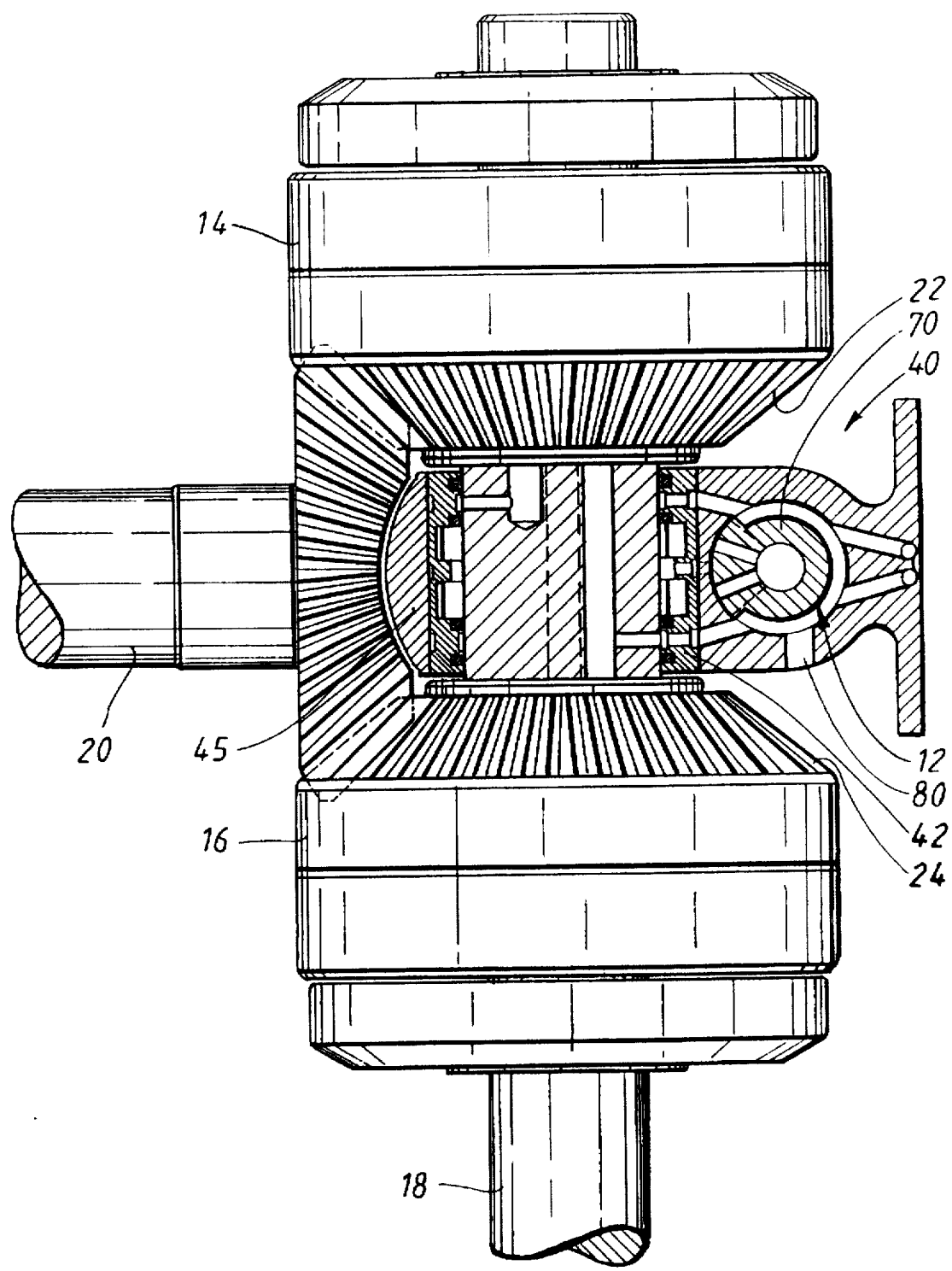
FIG. 2 is a partial sectional view of a power transmission system according to the present invention and incorporating a combined bearing and fluid supply unit according to the present invention.
Figure 3:
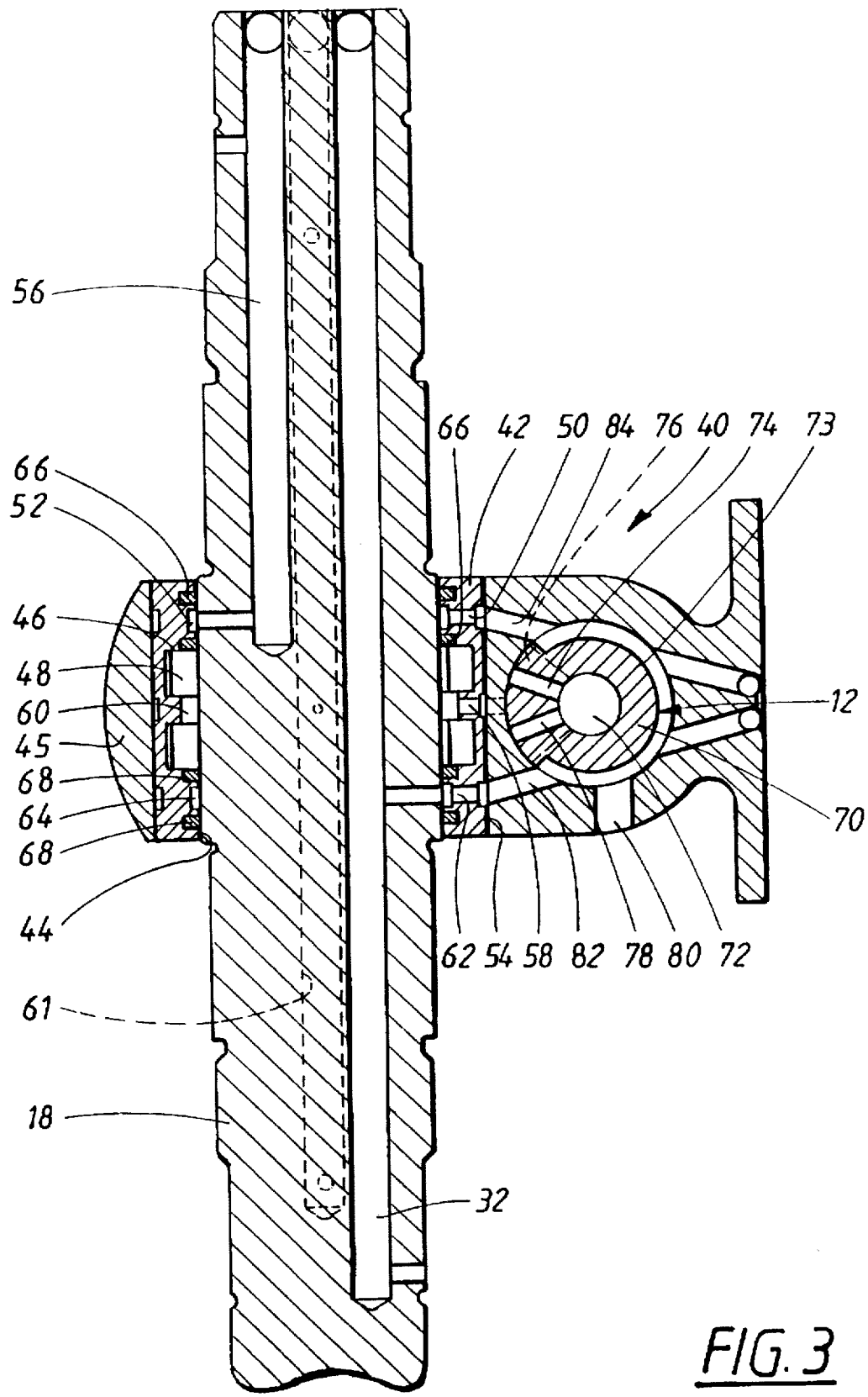
FIG. 3 is a sectional view of the combined bearing and fluid supply unit according to the present invention.

In the power transmission system according to the present invention and as illustrated in FIGS. 2 and 3, the valve assembly 12 is integrated in a combined bearing and fluid supply unit, generally denoted by reference numeral 40. Using the same reference numerals for like components, the combined bearing and fluid supply unit 40 is advantageously located between the pair of multi-plate clutches 14, 16. Although the use of multi-plate clutches is preferred, it is to be understood that the invention may also be practiced using clutch means other than multi-plate clutches, for example single plate clutches.

As is most clearly illustrated in FIG. 3, the combined bearing and fluid supply unit 40 includes a generally cylindrical housing 42 having a circular opening extending therethrough, with the circular opening having an inner surface 44. The housing 42 is adapted to be press-fitted into a support element 45, with the support element 45 including the valve assembly 12. In accordance with the invention, the inner surface 44 of the housing 42 is provided with at least one first circumferentially extending channel 46 which accommodates bearings 48 such as roller bearings, ball bearings, taper bearings, or plain bearings. As shown in FIGS. 2 and 3, the housing 42 preferably accommodates a pair of roller bearings 48, axially spaced apart, which are adapted to support a drive shaft 18 passing through the circular opening. With particular reference to FIG. 2, the shaft 18 is arranged to be driven by a substantially horizontally disposed input shaft 20 via a pair of bevel gears 22, 24.

In accordance with one embodiment of the present invention, the housing 42 has a first bore 50 extending radially from a second circumferentially extending channel 52 in the inner surface 44 to an outer surface 54 of the housing. The second circumferentially extending channel 52 is adapted to convey fluid passing from the first bore 50 to a first internal passage 56 in the shaft 18. As will be explained in greater detail below, the first internal passage 56 cooperates with the upper multi-plate clutch 14 shown in FIG. 2.

The housing 42 may preferably include a second bore 58 extending radially from the inner surface 44 to the outer surface 54 of the housing. The second bore 58 is preferably in communication with a third circumferentially extending channel 60 in the inner surface of the housing. In a manner which will be explained below, the third circumferentially extending channel 60 is adapted to convey lubricating fluid passing from the second bore 58 to a second internal passage 61 in the shaft 18. Simultaneously, by locating the third circumferentially extending channel 60 between the axially spaced bearings 48, lubrication of the bearings 48 is ensured.

The housing 42 may also preferably include a third bore 62 extending radially from a fourth circumferentially extending channel 64 in the inner surface 44 of the housing to the outer surface 54 of the housing. The fourth circumferentially extending channel 64 is adapted to supply fluid passing from the third bore 62 to a third internal passage 32 in the shaft. As will be explained in greater detail below, the third internal passage 32 cooperates with the lower multi-plate clutch 16 shown in FIG. 2.

Preferably, the second and fourth circumferentially extending channels 52 and 64 are axially separated by the bearings 48 disposed therebetween.

In order to ensure that fluid from the valve assembly 12 is reliably conveyed to its intended destinations, the second circumferentially extending channel 52 is located between a first pair of sealing rings 66 accommodated in first circumferential grooves in the inner surface 44 of the housing 42. Similarly, the fourth circumferentially extending channel 64 is located between a second pair of sealing rings 68 accommodated in second circumferential grooves in the inner surface 44 of the housing 42. Preferably, the sealing rings 66 and 68 are made from sintered bronze having a low-friction coating of, for example, TEFLON.

Fluid supplied to the bores 50, 58, and 62 is controlled by the valve assembly 12. More specifically, the valve assembly comprises a generally cylindrical valve member 70 having an internal fluid supply passage 72 delimited by a cylindrical wall 73. The internal fluid supply passage 72 receives fluid from a pump (not shown). Depending on the power and torque output of the engine in the vessel to which the transmission arrangement is mounted, the fluid is supplied to the valve assembly at, for example, between 10 and 25 bar. The valve assembly 12 cooperates with the housing 42 via three radially extending bores 74, 76, and 78 which pass through the cylindrical wall 73 of the valve member 70.

In the position of the valve member 70 shown in FIGS. 2 and 3, the transmission system is in a neutral operating condition, and rotation of the input shaft 20 will therefore not be transferred to the drive shaft 18. In this neutral operating condition, the bores 50 and 62 in the housing 42 are in communication with a drain line 80 in the valve assembly. Thus, the hydraulic pressure in the first and third internal passages 56, 32 of the shaft 18 is substantially atmospheric, and neither of the clutches 14, 16 will be activated.

Regardless of the position of the valve member 70, bore 76 is in constant communication with the second bore 58 in the housing 42. Fluid is therefore always supplied to the third circumferentially extending channel 60 in the inner surface of the housing, and the bearings 48 are thus continually lubricated. Third circumferentially extending channel 60 also always supplies second internal passage 61 with fluid. Passage 61 conveys lubricating fluid to both upper and lower clutches 14 and 16; thus, the clutches are continually lubricated as well.

In order to engage forward gear, the valve member 70 is rotated counter-clockwise (as viewed in FIGS. 2 and 3), so that bore 78 is brought into communication with the third bore 62 via a first passageway 82 in the support element 45. In this position of the valve member 70, fluid is conducted from the internal fluid supply passage 72 of the valve assembly to bore 78, then to first passageway 82, and on to third bore 62. From third bore 62, fluid is conveyed to fourth circumferentially extending channel 64, then to the third internal passage 32 of the drive shaft 18, and from there to the lower multi-plate clutch 16. Due to the pressure exerted by the fluid on the plates of the clutch 16, the clutch engages plates (not shown) carried on the drive shaft 18 to cause the drive shaft to rotate.

In a similar manner, when it is desired to engage reverse gear, the valve member 70 is rotated clockwise (as viewed in FIGS. 2 and 3), so that bore 74 is brought into communication with the first bore 50 via a second passageway 84 in the support element 45. In this position of the valve member 70, fluid is conducted from the internal fluid supply passage 72 of the valve assembly to bore 74, then to second passageway 84, and then to first bore 50. From first bore 50, fluid is conveyed to second circumferentially extending channel 52, then to the first internal passage 56 of the drive shaft 18 and from there to the upper multi-plate clutch 14. Due to the pressure exerted by the fluid on the plates of the clutch 14, the clutch engages plates (not shown) carried on the drive shaft 18 to cause the drive shaft to rotate in a direction opposite to that described above.

The invention is not restricted to the embodiments described above and shown in the drawings, but may be varied within the scope of the appended claims. For example, it is preferred to use multi-plate clutches, however single-plate clutches may also be used.

What is claimed is:

1. A combined bearing and fluid supply unit for supplying fluid to at least one internal passage in a shaft, said unit comprising:

a housing having a circular opening extending therethrough adapted to accommodate said shaft, said circular opening having an inner surface, said inner surface being provided with at least one first circumferentially extending channel and a second circumferentially extending channel, said housing further having a first bore extending radially from said second circumferentially extending channel to an outer surface of said housing, said second circumferentially extending channel being adapted to convey fluid passing through said first bore to a first one of said at least one internal passage in the shaft;

at least one bearing provided in said at least one first circumferentially extending channel, said bearing being adapted to support the shaft passing through said circular opening.

2. The combined bearing and fluid supply unit as claimed in claim 1, wherein said housing further comprises a second bore extending radially through said housing from said inner surface to said outer surface, said second bore being adapted to convey a lubricating fluid to said bearing.

3. The combined bearing and fluid supply unit as claimed in claim 2, wherein said housing further comprises a third circumferentially extending channel, provided in said inner surface of said housing and in communication with said second bore, said third circumferentially extending channel being adapted to convey said lubricating fluid passing from said second bore to the shaft and to said bearing.

4. The combined bearing and fluid supply unit as claimed in claim 3, further comprising two first circumferentially extending channels provided in said inner surface, said first circumferentially extending channels being located axially on either side of said second bore; and two bearings, each of said bearings being disposed respectively in one of said first circumferentially extending channels.

5. The combined bearing and fluid supply unit as claimed in claim 3, wherein said housing further comprises:

a fourth circumferentially extending channel in said inner surface of said housing; and a third bore extending radially through said housing from said fourth circumferentially extending channel to said outer surface, said fourth circumferentially extending channel being adapted to supply fluid passing from said third bore to the shaft.

6. The combined bearing and fluid supply unit as claimed in claim 5, wherein said at least one bearing is disposed between second and fourth circumferentially extending channels.

7. The combined bearing and fluid supply unit as claimed in claim 6, further comprising:

a first pair of sealing rings, accommodated in first circumferential grooves in said inner surface of said housing, said second circumferentially extending channel being disposed between said first sealing rings; and a second pair of sealing rings, accommodated in second circumferential grooves in said inner surface of said housing, said fourth circumferentially extending channel being disposed between said second sealing rings.

8. The combined bearing and fluid supply unit as claimed in claim 4, wherein said bearings include rolling bearings.

9. The combined bearing and fluid supply unit as claimed in claim 7, wherein said at least one bearing includes at least one rolling bearing.

10. The combined bearing and fluid supply unit as claimed in claim 1, wherein said housing is generally cylindrical and is adapted to be press-fitted into a support element.

11. A power transmission system comprising:

an input shaft having a first bevel gear attached thereto;

a drive shaft arranged substantially perpendicular to said input shaft, said drive shaft having a pair of second bevel gears for cooperation with said first bevel gear on said input shaft, said drive shaft having first, second, and third internal passages;

a clutch for selectively and alternately engaging said frist bevel gear with one of said second bevel gears for co-rotation with said drive shaft; and a bearing and fluid supply unit, having a housing having an opening adapted to accommodate said drive shaft, said opening having an inner surface, said inner surface being provided with at least one first circumferentially extending channel and a second circumferentially extending channel, at least one bearing provided in said at least one first circumferentially extending channel, said bearing being adapted to support said drive shaft, a first bore extending radially through said housing from said second circumferentially extending channel to an outer surface of said housing, said second circumferentially extending channel being adapted to convey fluid passing from said first bore to said first internal passage, a second bore extending radially through said housing from said inner surface to said outer surface and being adapted to convey a lubricating fluid to said bearing, a third circumferentially extending channel provided in said inner surface of said housing and in communication with said second bore and said bearing and being adapted to convey said lubricating fluid from said second bore to said second internal passage and to said bearing, a fourth circumferentially extending channel in said inner surface of said housing, a third bore extending radially through said housing from said fourth circumferentially extending channel to said outer surface, said fourth circumferentially extending channel being adapted to supply fluid from said third bore to said third internal passage.

12. The power transmission system as claimed in claim 11, wherein said unit is positioned between said pair of second bevel gears.

13. The power transmission arrangement as claimed in claim 11, wherein:
   said first internal passage is arranged to selectively convey fluid to said clutch cooperating with a first of said pair of second bevel gears when said first of said pair of second bevel gears is engaged with said first bevel gear;
   said second internal passage is arranged to continuously convey lubricating fluid to said bearing; and
   said third internal passage is arranged to selectively convey fluid to said clutch cooperating with a second of said pair of second bevel gears when said second of said pair of second bevel gears is engaged with said first bevel gear.

14. The power transmission arrangement as claimed in claim 13, further comprising a valve assembly, in communication with said combined bearing and fluid supply unit, said valve assembly being adapted to selectively supply fluid to one of: i) said first internal passage; ii) said third internal passage; and iii) neither of said first and third internal passages, said valve assembly being adapted to continuously supply fluid to said second internal passage.

15. A combined bearing and fluid supply unit comprising:
   a housing having a circular opening extending therethrough adapted to accommodate a shaft, said circular opening having an inner surface, said inner surface being provided with at least one first circumferentially extending channel and a second circumferentially extending channel, said housing further having a first bore and a second bore, the first bore extending radially from said second circumferentially extending channel to an outer surface of said housing, said second circumferentially extending channel being adapted to convey fluid passing through said first bore to an internal passage in the shaft; and
   at least one bearing provided in said at least one first circumferentially extending channel, said bearing being adapted to support the shaft passing through said circular opening, the second bore extending radially through said housing from said inner surface to said outer surface, said second bore being adapted to convey a lubricating fluid to said bearing.

* * * * *